(12) United States Patent
Aboshi

(10) Patent No.: US 9,580,015 B2
(45) Date of Patent: Feb. 28, 2017

(54) IMAGE DISPLAY DEVICE

(71) Applicant: JVC KENWOOD Corporation, Yokohama-shi (JP)

(72) Inventor: Kazutaka Aboshi, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 78 days.

(21) Appl. No.: 14/597,683

(22) Filed: Jan. 15, 2015

(65) Prior Publication Data

US 2015/0123879 A1    May 7, 2015

Related U.S. Application Data

(63) Continuation of application No. PCT/JP2013/004469, filed on Jul. 23, 2013.

(30) Foreign Application Priority Data

Jul. 30, 2012   (JP) ................................ 2012-168937

(51) Int. Cl.
*G09G 5/00*   (2006.01)
*G09F 9/00*   (2006.01)
(Continued)

(52) U.S. Cl.
CPC .............. *B60R 1/00* (2013.01); *G02B 5/0294* (2013.01); *G02B 5/3025* (2013.01);
(Continued)

(58) Field of Classification Search
CPC ... G09F 9/00; G09F 19/18; B60R 1/00; B60R 2300/205; G02B 5/3025; G02B 27/0101; G02B 2027/0118; G02B 5/0294
See application file for complete search history.

(56) References Cited

U.S. PATENT DOCUMENTS

2006/0250697 A1* 11/2006 Iwane ................... G02B 27/01
   359/636
2012/0262646 A1* 10/2012 Iwata ................... G02B 5/0236
   349/64

FOREIGN PATENT DOCUMENTS

| JP | 10-278629 A | 10/1998 |
| JP | 2005-274955 A | 10/2005 |
| JP | 2007-186016 A | 7/2007 |

OTHER PUBLICATIONS

International Search Report issued in PCT International Application No. PCT/JP2013/004469 dated Aug. 20, 2013.
(Continued)

*Primary Examiner* — Charles Hicks
(74) *Attorney, Agent, or Firm* — Venable LLP; Michael A. Sartori; Laura G. Remus

(57) ABSTRACT

An image display device includes: an optical unit that generates image display light based on an image signal; a projection unit that projects the image display light generated by the optical unit; and a combiner that presents a virtual image by reflecting the image display light projected from the projection unit. The projection unit includes: a first wave plate that converts linearly-polarized image display light emitted from an image display element into circularly-polarized image display light; a diffuser plate that diffuses the circularly-polarized image display light emitted from the first wave plate; a second wave plate that converts the circularly-polarized image display light diffused by the diffuser plate into linearly-polarized image display light; and a polarization plate that transmits the linearly-polarized image display light emitted from the second wave plate.

4 Claims, 9 Drawing Sheets

(51) Int. Cl.
*B60R 1/00* (2006.01)
*G09F 19/18* (2006.01)
*G02B 27/01* (2006.01)
*G02B 5/02* (2006.01)
*G02B 5/30* (2006.01)

(52) U.S. Cl.
CPC ........... *G02B 27/0101* (2013.01); *G09F 9/00* (2013.01); *G09F 19/18* (2013.01); *B60R 2300/205* (2013.01); *G02B 2027/0118* (2013.01)

(56) References Cited

OTHER PUBLICATIONS

International Preliminary Report on Patentability issued in PCT International Application No. PCT/JP2013/004469 dated Feb. 3, 2015.

* cited by examiner

IMAGE DISPLAY DEVICE

CROSS REFERENCE TO RELATED APPLICATION

This application is based upon and claims the benefit of priority from the prior Japanese Patent Application No. 2012-168937, filed Jul. 30, 2012, the contents of which are incorporated herein by references.

BACKGROUND

1. Field of the Invention

The present invention relates to an image display device.

2. Description of the Related Art

Image display devices called head up displays are known. Head up displays have an optical element called combiner. This combiner allows external light to pass through and reflects image display light projected from an optical unit provided in a head up display. This allows the user to visually recognize an image related to the image display light while overlapping the image on a landscape via the combiner.

These image display devices called head up displays have received attention as in-vehicle image display devices in recent years since the image display devices allow a driver of a vehicle to also recognize, almost without changing the direction of the line of sight or a focus for visually recognizing a view outside the vehicle, information of an image projected from an optical unit.

For example, Patent document No. 1 discloses a head up display to be mounted on a dashboard of a vehicle that adjusts, by using an X-axis stage, a Z-axis stage, and a rotation stage, a space that can be visually recognized by a user.

[Patent document No. 1] Japanese Patent Application Publication No. 10-278629

Head up displays such as those described above display an image related to image display light while overlapping the image on a landscape via a combiner. Thus, when the head up displays are used under an environment illuminated by external light, the contrast of the image display light is relatively lowered in comparison with that of the external light, and the user's visibility may be affected thereby.

SUMMARY

In this background, a purpose of the present invention is to provide an image display device that is capable of displaying images with high visibility to a user even under an environment illuminated by external light.

An image display device according to one embodiment of the present invention includes: an optical unit that generates image display light based on an image signal; a projection unit that projects the image display light generated by the optical unit; and a virtual image presenting surface that presents a virtual image by reflecting the image display light projected from the projection unit, wherein the projection unit includes: a first wave plate that converts linearly-polarized image display light emitted from an image display element into circularly-polarized image display light; a diffuser plate that diffuses the circularly-polarized image display light emitted from the first wave plate; a second wave plate that converts the circularly-polarized image display light diffused by the diffuser plate into linearly-polarized image display light; and a polarization plate that transmits the linearly-polarized image display light emitted from the second wave plate. At least the second wave plate and the polarization plate are placed such that the second wave plate and the polarization plate serve as a projection port cover that blocks a projection port of the projection unit, and the projection port cover is provided parallel to a plane that forms the projection port and emits the image display light along a projection axis running from the projection unit to the virtual image presenting surface.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

Figure 1:
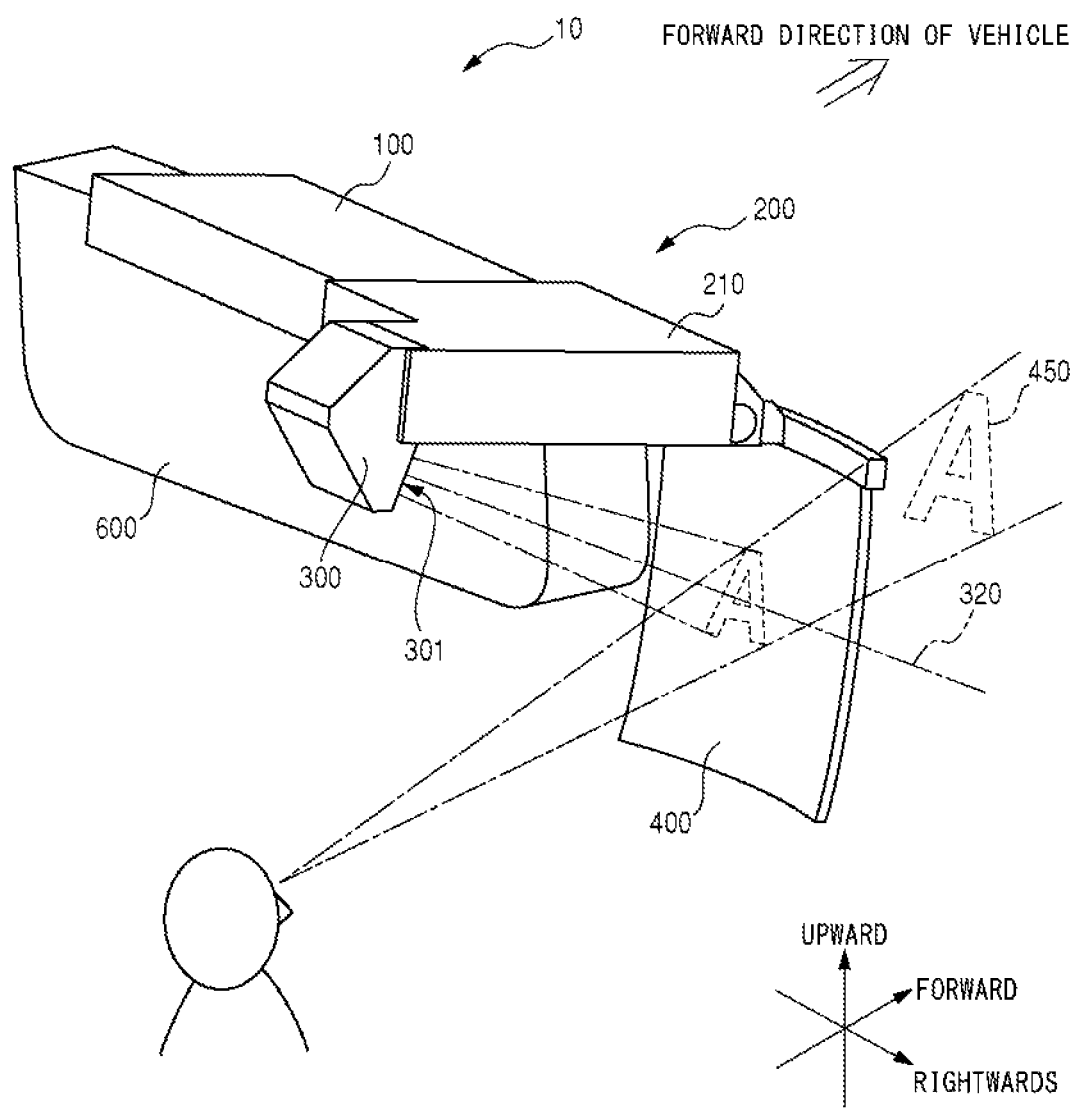
FIG. 1 is a perspective view of a head up display, which is a display device for a vehicle according to the present invention, shown by means of a field of view from the inside of the vehicle.

The invention will now be described by reference to the preferred embodiments. This does not intend to limit the scope of the present invention, but to exemplify the invention.

Described below is an explanation of the embodiments of the present invention with reference to figures. Specific numerical values and the like shown in the embodiments are shown merely for illustrative purposes to facilitate understanding of the invention and do not intend to limit the scope of the present invention, unless otherwise noted. In the subject specification and figures, elements having substantially the same functions and structures shall be denoted by the same reference numerals, and duplicative explanations will be omitted appropriately. Also, the illustration of elements that are not directly related to the present invention is omitted.

Figure 2:
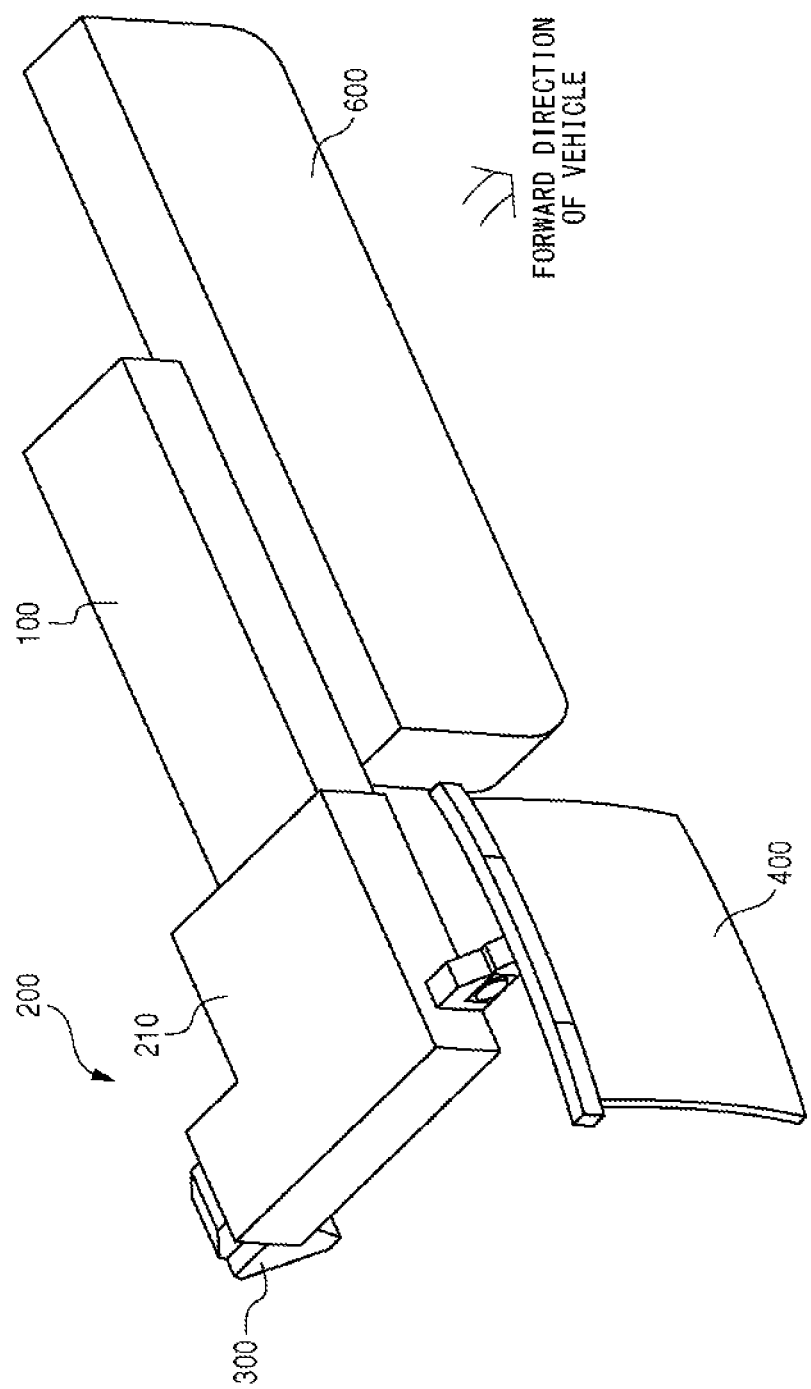
FIG. 2 is a perspective view of the head up display in FIG. 1 shown by means of a field of view from the side of a windshield.

Using a head up display attached to a rear-view mirror provided to a vehicle as an example for a display device for a vehicle according to the present embodiment, an explanation is given regarding the exterior configuration of the display device for a vehicle in reference to FIGS. 1 and 2. FIG. 1 is a perspective view of a head up display 10 according to the present embodiment observed by means of a field of view directed from a rear-view mirror 600, to which this head up display 10 is attached, to a windshield (not shown) of a vehicle. FIG. 2 is a perspective view of the head up display 10 observed by means of a field of view directed from the windshield (not shown) to the rear-view mirror 600. In the following explanations, directions that are shown as forward, backward, leftward, rightward, upward, and downward mean a forward direction, a backward direction, a leftward direction, a rightward direction, a direction that is vertical to a road surface on which a vehicle is placed and that is directed from the surface to the vehicle, and a direction that is opposite to the direction, respectively.

The head up display 10 generates an image signal related to an image displayed on a combiner 400 as a virtual image and is provided with a substrate housing portion 100 housing a circuit substrate (not shown) that outputs the generated image signal to an optical unit 200. An image signal output from an external device (not shown) such as a navigation device, a media reproduction device, or the like is input to the circuit substrate, and the circuit substrate 111 is also capable of outputting the image signal to the optical unit 200 after performing a predetermined process on the signal that has been input. This substrate housing portion 100 is connected to an attachment member (not shown), and the rear-view mirror 600 is held by the attachment member 500. Thereby, the head up display 10 is attached to the rear-view mirror 600. In order to facilitate explanations and understanding of the entire configuration of the head up display 10, the descriptions of the attachment member are omitted.

The head up display 10 is provided with the optical unit 200 to which an image signal output from the circuit substrate is input. The optical unit 200 is provided with an optical unit main body 210 and a projection unit 300. The optical unit main body 210 houses a light source and an image display element, which are described later, various optical lenses, and the like. The projection unit 300 houses various projection mirrors and an intermediate image screen, which are described later. An image signal output by the circuit substrate is projected from a projection port as image display light on the combiner 400 having a concave shape via each of the devices of the optical unit main body 210 and each of the devices of the projection unit 300.

In the present embodiment, a case where a liquid crystal on silicon (LCOS), which is a reflection type liquid crystal display panel, is used as an image display element is illustrated for example. However, a digital micromirror device (DMD) may be used as the image display element 240. In that case, the display device (head up display) is assumed to be formed by an optical system (optical unit or the like) and a drive circuit (circuit substrate or the like) according to an image display element (e.g., DMD) that is applied. Alternatively, the display device may be a laser-type display device in which micro electro mechanical systems (MEMS) or the like are used as an image display device.

A user, who is a driver, recognizes projected image display light as a virtual image via the combiner 400. In FIG. 1, the projection unit 300 is projecting image display light of a letter "A" on the combiner 400. Looking at the combiner 400, the user recognizes the letter "A" in such a manner as if the letter were displayed, for example, 1.7 m to 2.0 m ahead (in a forward direction of the vehicle). In other words, the user can recognize a virtual image 450. In this case, a central axis of the image display light projected on the combiner 400 from the projection unit 300 is defined as a projection axis.

Figure 3:
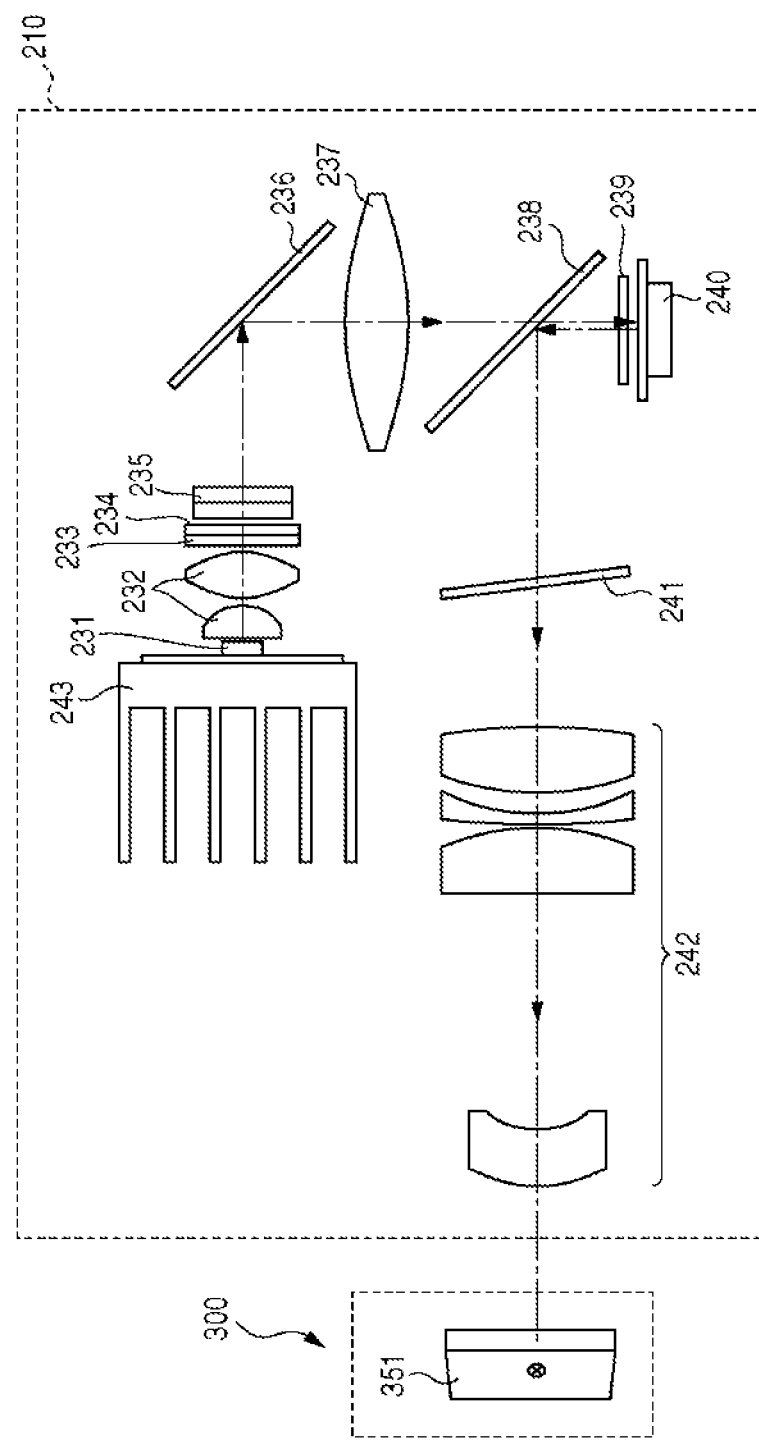
FIG. 3 is a diagram illustrating the internal configuration of an optical unit along with an optical path.
Figure 4:
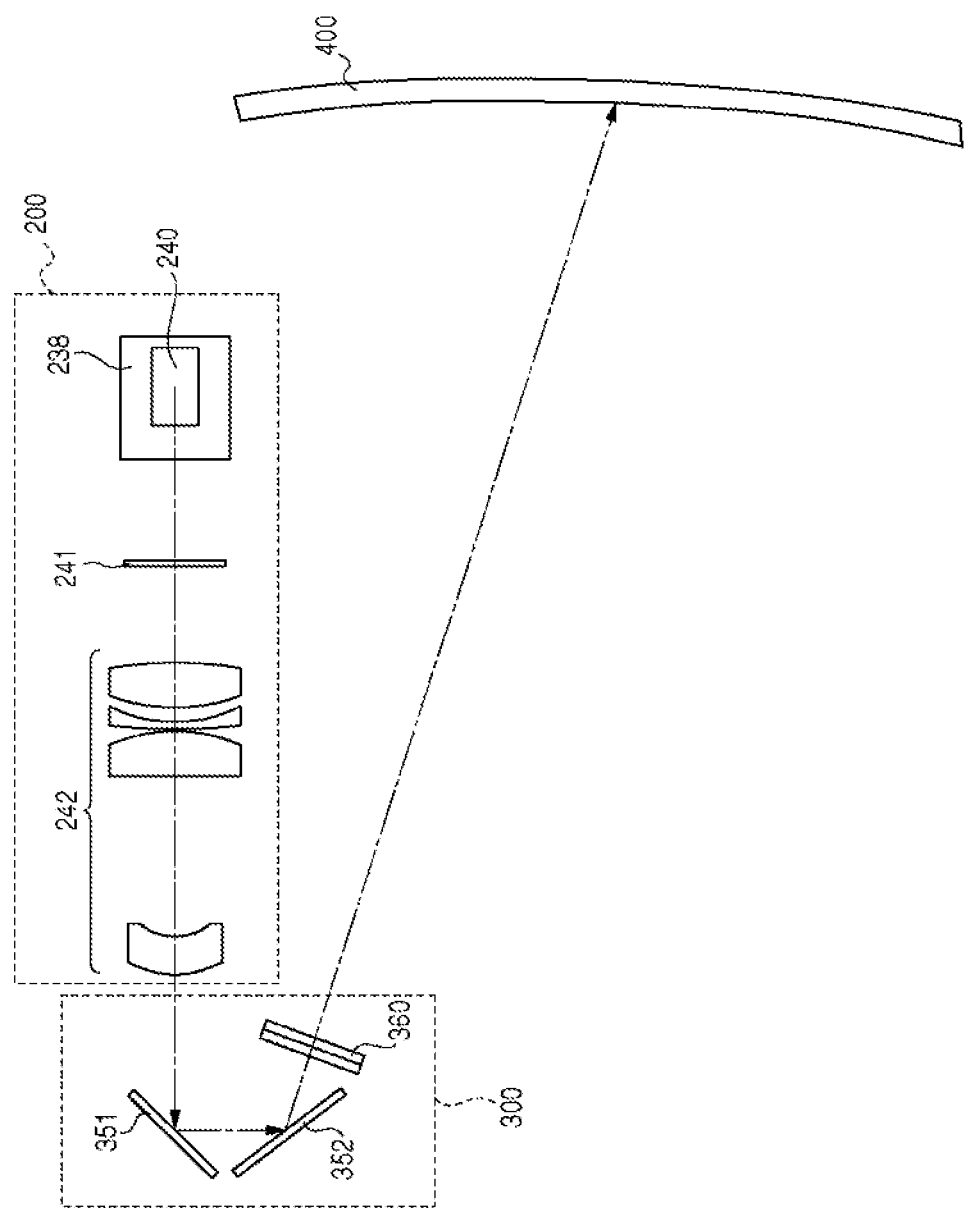
FIG. 4 is a diagram illustrating the internal configuration of the optical unit along with an optical path.

An explanation is now given regarding the internal configuration of the head up display 10. FIGS. 3 and 4 are diagrams for explaining the internal configuration of the optical unit 200 of the head up display 10 described above. FIG. 3 is a diagram illustrating the internal configuration of the optical unit main body 210 and a part of the internal configuration of the projection unit 300 along with an optical path related to image display light. FIG. 4 is a diagram illustrating the internal configuration of the projection unit 300 and a part of the internal configuration of the optical unit main body 210 along with an optical path related to image display light projected onto the combiner 400.

In reference to FIG. 3, an explanation is given regarding the internal configuration of the optical unit main body 210 and an optical path related to image display light. The optical unit main body 210 is provided with a light source 231, a collimate lens 232, a UV-IR (UltraViolet-Infrared Ray) cut filter 233, a polarizer 234, a fly-eye lens 235, a reflecting mirror 236, a field lens 237, a wire grid polarization beam splitter 238, a quarter-wave plate 239, a phase compensation plate 241, a projection lens group 242, and a heat sink 243.

The light source 231 consists of a light-emitting diode that emits white light or light in three colors: blue, green, and red. The heat sink 243 for cooling heat generated along with emission of light is attached to the light source 231. Light emitted by the light source 231 is changed to parallel light by the collimate lens 232. The UV-IR cut filter 233 absorbs and removes ultraviolet light and infrared light from the parallel light passed through the collimate lens 232. The polarizer 234 changes light that has passed through the UV-IR cut filter 233 to P-polarized light without disturbance. The fly-eye lens 235 then adjusts the brightness of light that has passed through the polarizer 234 to be uniform.

The reflecting mirror 236 deflects the optical path of light that has passed through each cell of the fly-eye lens 235 by 90 degrees. Light reflected by the reflecting mirror 236 is collected by the field lens 237. Light collected by the field lens 237 is radiated to the image display element 240 via the wire grid polarization beam splitter 238 and quarter-wave plate 239 that transmit P-polarized light.

The image display element 240 is provided with a color filter of a red color, a green color, or a blue color for each pixel. The light radiated to the image display element 240 is changed to a color that corresponds to each pixel, modulated by a liquid crystal composition provided on the image display element 240, and emitted toward the wire grid polarization beam splitter 238 while being S-polarized image display light. The emitted S-polarized light is reflected by the wire grid polarization beam splitter 238 and enters the projection lens group 242 after changing the optical path and passing through the phase compensation plate 241.

The image display light transmitted through the projection lens group 242 exits the optical unit main body 210 and enters the projection unit 300. A first projection mirror 351 provided on the projection unit 300 then changes the optical path of the entering image display light.

Subsequently, in reference to FIG. 4, an explanation is given regarding the internal configuration of the projection unit 300 and an optical path related to image display light. The projection unit 300 is provided with the first projection mirror 351, a second projection mirror 352, and the intermediate image screen 360.

By reflecting image display light projected via the wire grid polarization beam splitter 238, the phase compensation plate 241, and the projection lens group 242 provided in the optical unit main body 210, the first projection mirror 351 and the second projection mirror 352 deflect the optical path of the image display light to a direction projected to the combiner 400.

The intermediate image screen 360 has a property to diffuse, at a predetermined light distribution angle, image display light that is transmitted. As the intermediate image screen 360, for example, a diffuser plate provided on the surface thereof with minute concavities and convexities, a diffusion film on which bead diffusion materials with a diameter of around several tens of microns are distributed, or the like is used. The intermediate image screen 360 is provided at a position where a real image based on image display light projected by the projection lens group 242 and reflected by the first projection mirror 351 and the second projection mirror 352 is formed. Therefore, the image display light related to the real image formed on the intermediate image screen 360 is transmitted while being diffused by the intermediate image screen 360 and projected on the combiner 400 after passing through a projection port 301. The user then recognizes a virtual image related to the image display light projected on the combiner 400 in the forward direction.

At this time, the image display light diffused by the intermediate image screen 360 has a predetermined light distribution angle, and the image display light reflected by the combiner 400 and presented to the user also has a predetermined light distribution angle. Therefore, even when the user moves the position of his/her line of sight, the user is able to visually recognize the virtual image related to the image display light in a good condition as long as the position of the line of sight is in the range of the light distribution angle of the image display light reflected by the combiner 400.

The internal configuration described above allows the user to visually recognize a virtual image based on an image signal output from the circuit substrate while overlapping the virtual image on the real landscape via the combiner 400. Even if the user moves the position of his/her line of sight, the intermediate image screen 360 allows the user to check image display light with high visibility by having the property to diffuse transmitted light at a predetermined light distribution angle.

Meanwhile, providing the above-stated intermediate image screen 360 causes external light to become incident on the intermediate image screen 360 and become diffused and reflected. Thereby, the contrast of the image display light may be lowered. First, an explanation is given regarding a decrease in the contrast of image display light to be solved by the present invention using FIG. 5, and an explanation is given regarding the intermediate image screen 360 according to an embodiment of the present invention using FIG. 6 and the subsequent figures.

Figure 5:
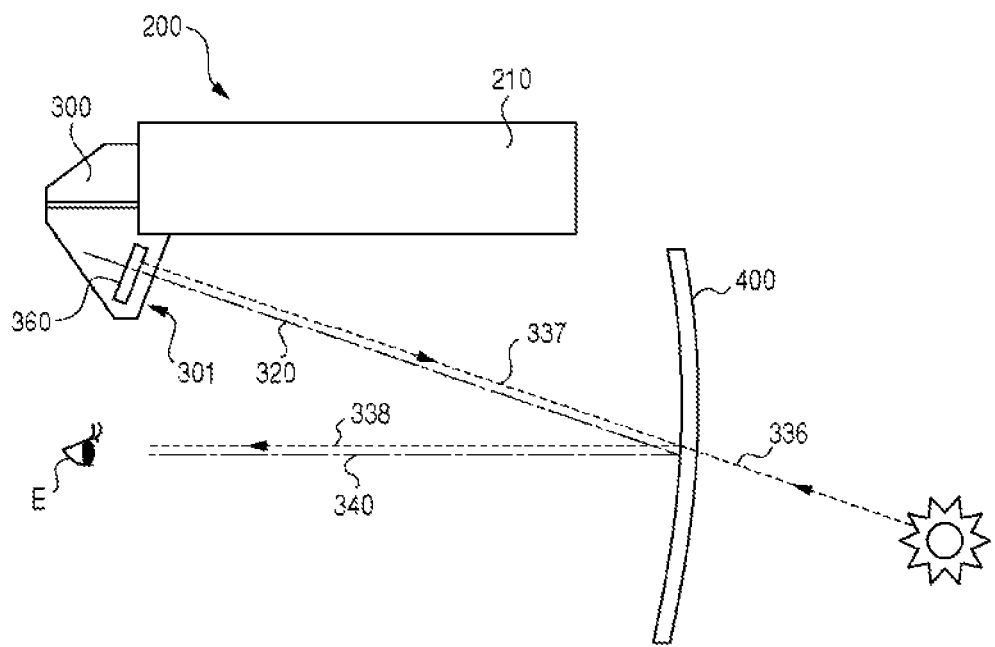
FIG. 5 is a diagram for explaining external light that is reflected by a conventional intermediate image screen.

FIG. 5 is a diagram for explaining external light that is reflected by a conventional intermediate image screen 360 and shows a condition where external light 336 such as sunlight is incident along a projection axis 320 of image display light projected from the projection unit 300. Image display light emitted from the projection port 301 reaches the combiner 400 along the projection axis 320, becomes reflected by the combiner 400, and reaches an eye E of the user along a direction 340 of the line of sight. On the other hand, the external light 336 entering along the projection axis 320 enters the projection port 301 and reaches the intermediate image screen 360. A part of the external light 336 that has reached the intermediate image screen 360 is diffused and reflected by the intermediate image screen 360 and reaches the combiner 400 as external light 337 having a predetermined light distribution angle. External light 338 reflected by the combiner 400 travels along the direction 340 of the line of sight and visually recognized by the user.

At this time, since the external light 338 reflected by the combiner 400 reaches the eye E of the user passing through the same path as that of image display light projected from the projection unit 300, the user visually recognizes an image in which the image display light projected from the projection unit 300 and the external light 338 are superimposed on each other. The external light 338 is diffused and reflected at the predetermined light distribution angle by the intermediate image screen 360. Thus, the external light 338 reaches the eye E of the user in a condition where the brightness of the incident external light 336 is uniformly distributed. In that case, the user visually recognizes the image display light projected by the projection unit 300 along with the brightly distributed external light 338. Thus, the contrast of the image display light presented to the user is lowered compared to a case where there is no external light 338. When the contrast of the image display light is lowered, the user cannot visually recognize the image display light in a good condition.

Thus, as an intermediate image screen 361 according to the present embodiment, an explanation is given regarding an intermediate image screen 361 capable of blocking the external light 337 that is diffused and reflected while maintaining the performance of diffusing image display light projected by the projection unit 300.

Figure 6:
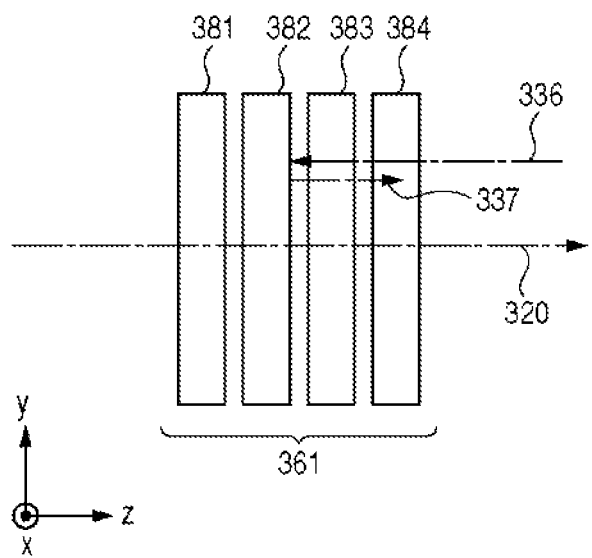
FIG. 6 is a lateral view illustrating the configuration of an intermediate image screen according to an embodiment.

FIG. 6 is a lateral view illustrating the configuration of the intermediate image screen 361 according to the embodiment. The intermediate image screen 361 is provided with a first wave plate 381, a polarization-maintaining type diffuser plate 382, a second wave plate 383, and an absorption type polarization plate 384. The first wave plate 381, the polarization-maintaining type diffuser plate 382, the second wave plate 383, and the absorption type polarization plate 384 are provided in order such that image display light emitted in the direction of the projection axis 320 enters vertically and provided such that facing surfaces thereof are close to each other. The first wave plate 381, the polarization-maintaining type diffuser plate 382, the second wave plate 383, and the absorption type polarization plate 384 may be provided such that facing surfaces thereof are in contact with each other.

In FIG. 6, a direction of the projection axis 320 in which image display light is emitted is set to be a z-axis direction. A horizontal direction that is perpendicular to the z-axis direction is set to be an x-axis direction, and a direction that is perpendicular to the z-axis direction and the x-axis direction is set to be a y-axis direction. An explanation is given on the condition that image display light that enters the first wave plate 381 of the intermediate image screen 361 is linearly-polarized light in which an electric field oscillates in a y direction.

The first wave plate 381 is a quarter-wave plate and is provided so as to convert linearly-polarized image display light that is emitted from the optical unit 200 and that vertically enters the first wave plate 381 into circularly-polarized image display light. For example, the first wave plate 381 is provided at a position such that a phase advancing axis is rotated by 45 degrees with respect to the y-axis direction in a counterclockwise direction and that a phase delaying axis is rotated by 45 degrees with respect to the y-axis direction in a clockwise direction when viewed toward the −z direction. Therefore, being transmitted through the first wave plate 381, y-polarized image display light that has entered the first wave plate 381 turns to clockwise circularly-polarized image display light that is emitted in a +z direction.

The polarization-maintaining type diffuser plate 382 has a property to diffuse, while maintaining the polarization direction of light that is transmitted, the transmitted light at a predetermined light distribution angle and is constituted of a polymer having a surface on which minute concave and convex processing is performed, a glass substrate provided with minute concavities and convexities so as to have diffusivity, or the like. Processing for providing diffusivity is performed on one surface or both surfaces of the polarization-maintaining type diffuser plate 382. The clockwise circularly-polarized image display light emitted from the first wave plate 381 is diffused at a predetermined light distribution angle and transmitted by the polarization-maintaining type diffuser plate 382. The polarization state of the image display light transmitted through the polarization-maintaining type diffuser plate 382 and diffused is maintained, and clockwise circularly-polarized image display light diffused at a predetermined light distribution angle is emitted from the polarization-maintaining type diffuser plate 382.

The second wave plate 383 is a quarter-wave plate and is provided so as to convert the clockwise circularly-polarized image display light diffused by the polarization-maintaining type diffuser plate 382 into linearly-polarized image display light. For example, as in the case of the first wave plate 381, the second wave plate 383 is provided at a position such that a phase advancing axis is rotated by 45 degrees with respect to the y-axis direction in a counterclockwise direction and that a phase delaying axis is rotated by 45 degrees with respect to the y-axis direction in a clockwise direction when viewed toward the −z direction. Therefore, being transmitted through the second wave plate 383, the clockwise circularly-polarized image display light that has entered the second wave plate 383 turns to linearly-polarized light in which an electric field oscillates in an x direction.

The absorption type polarization plate 384 is a polarization plate that transmits light in which an electric field oscillates in a certain direction and absorbs light in which an electric field oscillates in a direction that is perpendicular to an oscillation direction for transmitting the light. The absorption type polarization plate 384 is provided such that the transmission axis of the absorption type polarization plate 384 is in the x-axis direction in order to transmit x-polarized image display light emitted from the second wave plate 383. Therefore, the x-polarized image display light that has entered the absorption type polarization plate 384 is directly transmitted without getting absorbed by the absorption type polarization plate 384. The x-polarized image display light that has transmitted through the absorption type polarization plate 384 is emitted toward the combiner 400 from the projection port 301 of the projection unit 300.

External light 336 that enters the intermediate image screen 361 is now described. Non-polarized external light 336 that has entered from the projection port 301 of the projection unit 300 enters the absorption type polarization plate 384. The absorption type polarization plate 384 is provided such that the transmission axis is in the x-axis direction. Thus, a component that oscillates in the y-axis direction of the external light 336 is absorbed, and a component that oscillates in the x-axis direction is transmitted. Therefore, the external light 336 that has been transmitted through the absorption type polarization plate 384 turns to x-polarized light. On the surface of the absorption type polarization plate 384, an antireflection film may be provided in order to prevent the external light 336 from being reflected on the surface of the absorption type polarization plate 384.

The x-polarized external light 336 that has been transmitted through the absorption type polarization plate 384 enters the second wave plate 383. The second wave plate 383 is provided at a position such that a phase advancing axis is rotated by 45 degrees with respect to the x-axis in a counterclockwise direction and that a phase delaying axis is rotated by 45 degrees with respect to the x-axis in a clockwise direction when viewed toward the +z direction. Therefore, being transmitted through the second wave plate 383, the x-polarized external light 336 that has entered the second wave plate 383 in the −z direction turns to clockwise circularly-polarized light.

The clockwise circularly-polarized external light 336 that has been transmitted through the second wave plate 383 enters the polarization-maintaining type diffuser plate 382, and a part of the clockwise circularly-polarized external light is diffused and reflected while the polarization state thereof is being maintained by the polarization-maintaining type diffuser plate 382. Therefore, the clockwise circularly-polarized external light 336 that has entered in the −z direction is reflected by the polarization-maintaining type diffuser plate 382 and turns to counterclockwise circularly-polarized external light 337 that is emitted in the +Z direction.

The counterclockwise circularly-polarized external light 337 that has been reflected by the polarization-maintaining type diffuser plate 382 is transmitted through the second wave plate 383 in the +z direction and turns to linearly-polarized light in which an electric field oscillates in a y direction. The y-polarized external light 337 that has been transmitted through the second wave plate 383 enters the absorption type polarization plate 384. Since the transmission axis of the absorption type polarization plate 384 is in the x direction, the y-polarized external light 337 is absorbed by the absorption type polarization plate 384 and is not transmitted.

The above configuration allows image display light projected by the projection unit 300 to be projected via the projection port 301 after being diffused at a predetermined light distribution angle by the polarization-maintaining type diffuser plate 382. On the other hand, the external light 336 that has entered from the projection port 301 is absorbed by the absorption type polarization plate 384 even when the external light 336 is diffused and reflected by the polarization-maintaining type diffuser plate 382 and is thus not emitted in the projection axis 320 of the image display light. Therefore, the external light 338 can be prevented from reaching the user's eyes, and a decrease in the contrast of the image display light to be presented to the user can be suppressed. Thus, even under an environment illuminated by external light, the user is capable of visually recognizing the image display light in a good condition.

Also, by using the polarization-maintaining type diffuser plate 382 that diffuses image display light while maintaining the polarization state thereof, image display light that is transmitted through the absorption type polarization plate 384 can be made brighter compared to a case where a diffuser plate that does not maintain the polarization state is used. If a diffuser plate that does not maintain the polarization state is used, image display light transmitted through the diffuser plate includes components other than those of clockwise circularly-polarized light, and the image display light transmitted through the second wave plate 383 thus includes components other than those of x-polarized light. The components other than those of x-polarized light are absorbed by the absorption type polarization plate 384, and the brightness of the image display light is lowered by the amount absorbed.

Figure 7:
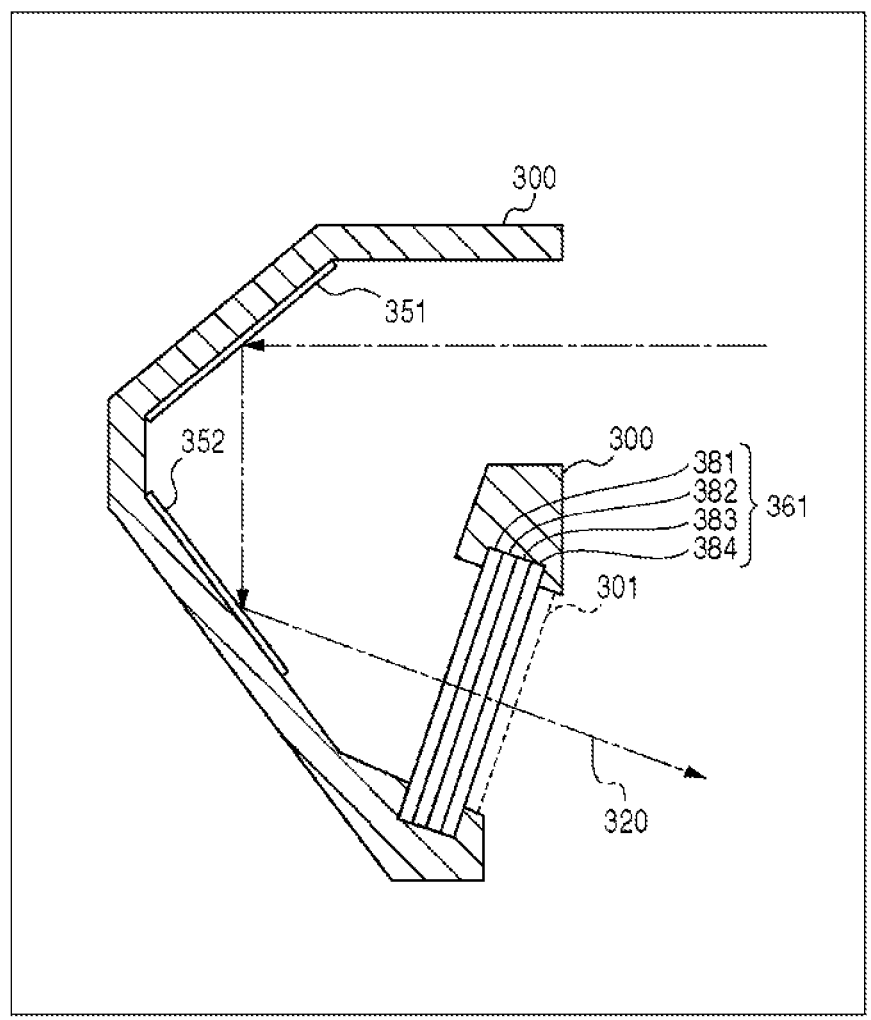
FIG. 7 is a cross-sectional lateral view illustrating the configuration of a projection unit according to the embodiment.

FIG. 7 is a cross-sectional lateral view illustrating the configuration of the projection unit 300 according to the embodiment. The intermediate image screen 361 is provided such that the intermediate image screen 361 blocks the projection port 301 of the projection unit 300 and is fixed to the projection unit 300 such that the surface thereof is perpendicular to a projection axis 320. Being provided such that the intermediate image screen 361 blocks the projection port 301, the intermediate image screen 361 can also prevent dust from entering the inside of the projection unit 300. Thereby, it is no longer necessary to separately provide a projection port cover for dust prevention, and the cost can thus be reduced.

Described above is an explanation of the present invention based on the embodiment. The embodiment is intended to be illustrative only, and it will be obvious to those skilled in the art that various modifications to constituting elements and processes could be developed and that such modifications are also within the scope of the present invention.

Figure 8:
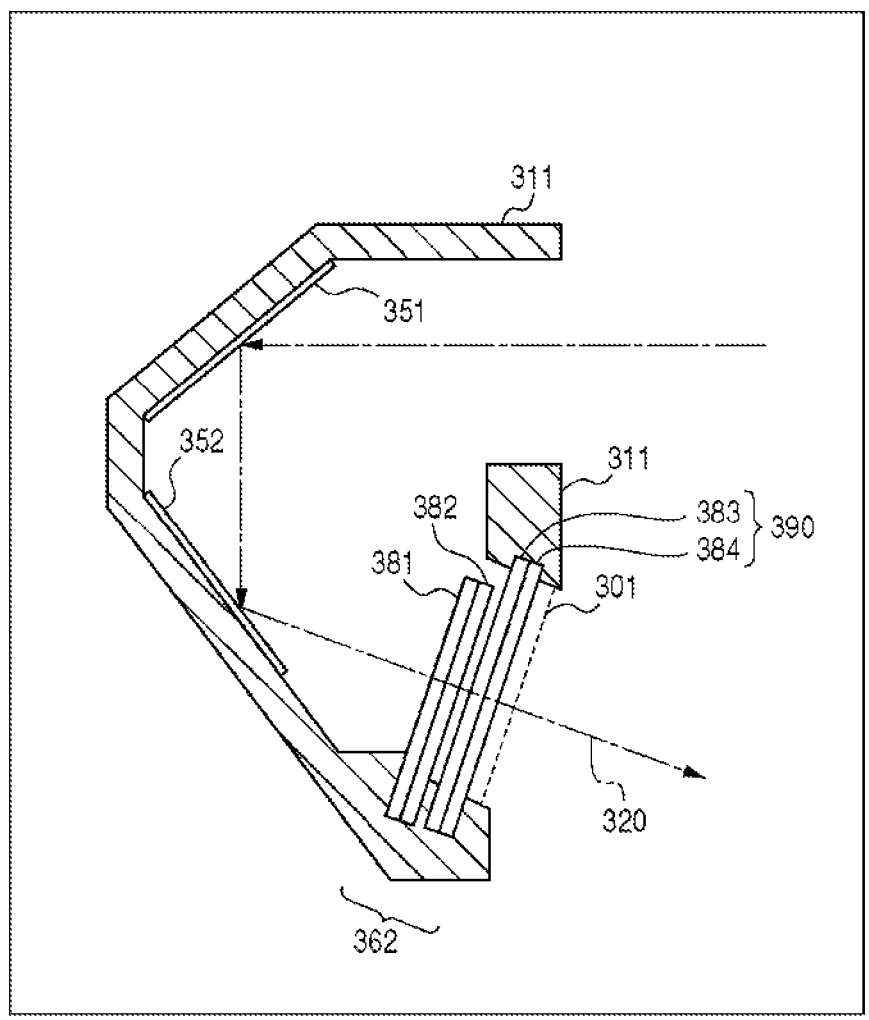
FIG. 8 is a cross-sectional lateral view illustrating the configuration of a projection unit according to a first exemplary variation.

FIG. 8 is a cross-sectional lateral view illustrating the configuration of a projection unit 311 according to a first exemplary variation. Different from the above-stated projection unit 300, the projection unit 311 according to the first exemplary variation is provided with an intermediate image screen 362 instead of the intermediate image screen 361.

Different from the intermediate image screen 361, the intermediate image screen 362 according to the first exemplary variation is fixed to the projection unit 311 such that a polarization-maintaining type diffuser plate 382 and a second wave plate 383 are spaced apart. Also, the second wave plate 383 and an absorption type polarization plate 384 are provided such that the second wave plate 383 and the absorption type polarization plate 384 blocks a projection port 301 of the projection unit 311 and have a role as a projection port cover 390.

With the above configuration, as in the case of the projection unit 300, while the projection unit 311 according to the first exemplary variation allows image display light to be diffused at a predetermined light distribution angle by the polarization-maintaining type diffuser plate 382 and to be emitted from the projection port 301, the projection unit 311 does not let external light 336 that has entered from the projection port 301 be emitted in the direction of a projection axis 320 of the image display light. Thus, even under an environment illuminated by external light, the projection unit 311 is capable of presenting the image display light to the user in a good condition.

Further, since the projection port 301 is covered by a projection port cover 390, dust is prevented from entering the inside of the projection unit 311. Since the projection port 301 is protected from dust by the projection port cover 390, a first wave plate 381 and the polarization-maintaining type diffuser plate 382 that constitute the intermediate image screen 362 can have an area that is smaller than the opening area of the projection port 301. This allows the cost of the intermediate image screen 362 according to the first exemplary variation to be lowered compared to the intermediate image screen 361 according to the embodiment.

Figure 9:
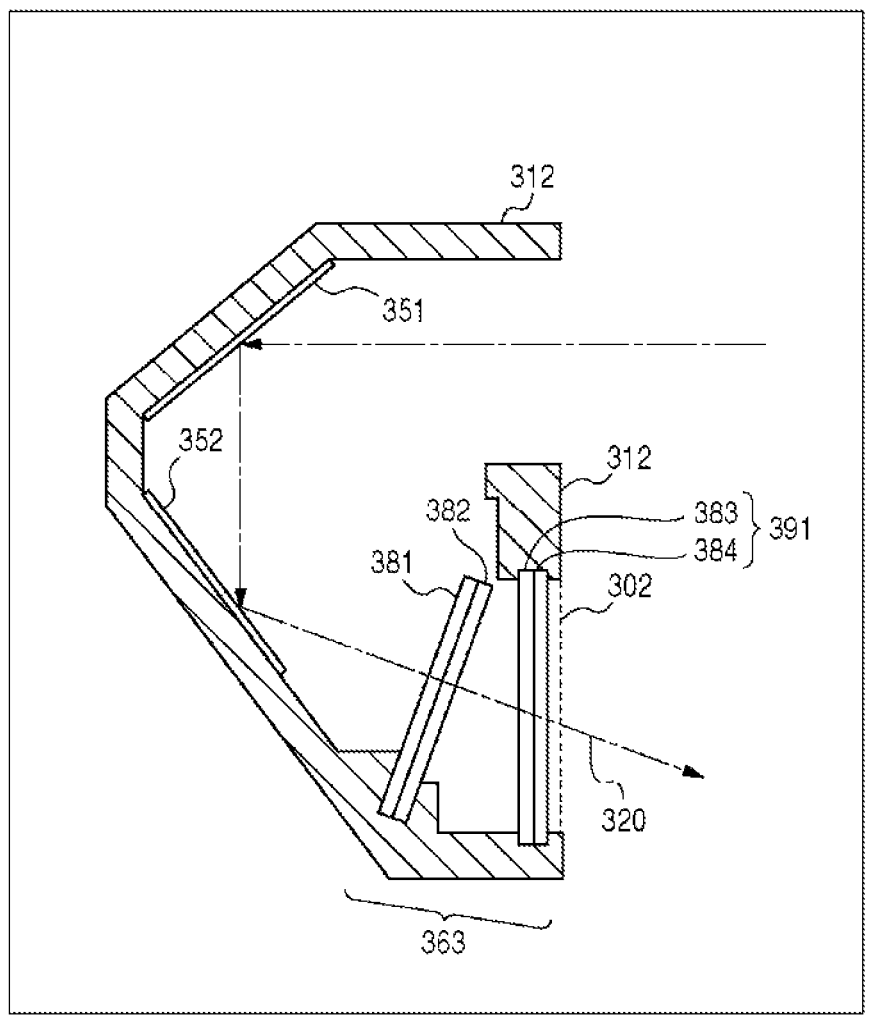
FIG. 9 is a cross-sectional lateral view illustrating the configuration of a projection unit according to a second exemplary variation.

FIG. 9 is a cross-sectional lateral view illustrating the configuration of a projection unit 312 according to a second exemplary variation. Different from the projection unit 311 according to the first exemplary variation, the projection unit 312 according to the second exemplary variation is provided with a projection port cover 391 instead of the projection port cover 390. Further, the projection unit 312 is provided with a projection port 302, in which a plane that forms the projection port is not perpendicular to a projection axis 320, instead of the projection port 301.

The projection port cover 391 according to the second exemplary variation is provided with a second wave plate 383 and an absorption type polarization plate 384 and is fixed to the projection unit 312 such that the respective surfaces of the second wave plate 383 and the absorption type polarization plate 384 intersect with the projection axis 320 at a predetermined angle, blocking the projection port 302. The projection port cover 391 is provided parallel to a plane that forms the projection port 302. Therefore, image display light that is diffused by the polarization-maintaining type diffuser plate 382 obliquely enters the projection port cover 391 at a predetermined incident angle.

Figure 10:
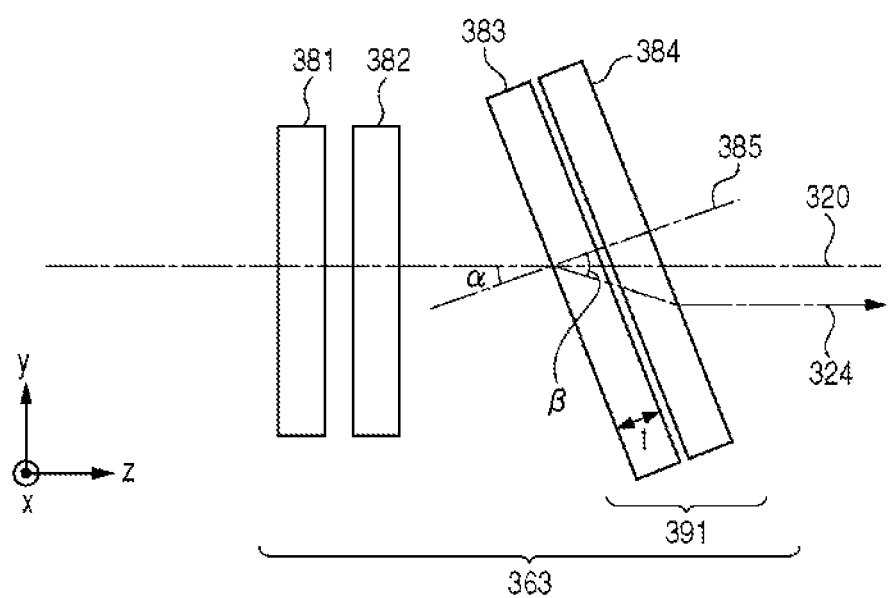
FIG. 10 is a lateral view illustrating the configuration of an intermediate image screen and a projection port cover according to a second exemplary variation.

FIG. 10 is a lateral view illustrating the configuration of an intermediate image screen 363 according to the second exemplary variation. A normal line 385 shown in FIG. 10 is an axis that is perpendicular to a surface of the second wave plate 383 and a surface of the absorption type polarization plate 384 that are light incident surfaces. The second wave plate 383 and the absorption type polarization plate 384 constituting the projection port cover 391 are provided at a position where image display light emitted along the projection axis 320 obliquely enters the respective surfaces thereof at an incident angle α with respect to the normal line 385. The polarization-maintaining type diffuser plate 382 is provided such that diffused image display light obliquely enters the second wave plate 383 at the incident angle α.

At this time, the image display light obliquely entering the second wave plate 383 at the incident angle α is refracted at the surface of the second wave plate 383 and is transmitted through the second wave plate 383 at a refraction angle β. Thus, when the plate thickness of the second wave plate 383 is set to be t, the distance in which the image display light is transmitted through the second wave plate 383 is t/sin β. Thus, in order for the circularly-polarized image display light obliquely entering the second wave plate 383 to turn to linearly-polarized image display light after being transmitted for the distance of t/sin β, the plate thickness of the second wave plate 383 and the respective directions of the phase advancing axis and the phase delaying axis are adjusted. With this, the image display light that has been transmitted through the second wave plate 383 turns to x-polarized image display light. Then, the x-polarized image display light emitted from the second wave plate 383 is transmitted through the absorption type polarization plate 384 and emitted as projection light 324 that is parallel to the projection axis 320.

The above configuration allows the direction of the plane that forms the projection port 302 to be at an arbitrary angle in the projection unit 312 according to the second exemplary variation, increasing the degree of freedom in designing the exterior of the projection unit 312.

In the above-stated first and second exemplary variations, the projection port covers 390 and 391 are configured to be provided with a second wave plate 383 and an absorption type polarization plate 384. However, the configuration given is non-limiting. For example, the projection port covers 390 and 391 may be configured to be provided with an absorption type polarization plate 384.

In the above-stated embodiment and exemplary variations, the explanation is made regarding a case where a head up display is used as a display device for a vehicle while being attached to a rear-view mirror provided to a vehicle. Alternatively, the head up display may be a display device for a vehicle that is used while being attached at another position. For example, a projection unit may be provided at the upper part of a dashboard of a vehicle or the inside of the dashboard, and the projection unit may present a virtual image to a user by projecting image display light on a combiner provided between the windshield and the dashboard of the vehicle.

Also, in the above-stated embodiment, an explanation is made for an image display device used as a display device for a vehicle that is placed in a vehicle. Alternatively, the image display device may be those used for other applications. For example, a lens surface of glasses or the like worn by a user may be used as a combiner, and a virtual image may be presented to the user by projecting image display light onto the combiner.

What is claimed is:

1. An image display device comprising:
   an optical unit that generates image display light based on an image signal;
   a projection unit that projects the image display light generated by the optical unit; and
   a virtual image presenting surface that presents a virtual image by reflecting the image display light projected from the projection unit;
   wherein the projection unit includes:
   a first wave plate that converts linearly-polarized image display light emitted from an image display element into circularly-polarized image display light;
   a diffuser plate that diffuses the circularly-polarized image display light emitted from the first wave plate;
   a second wave plate that converts the circularly-polarized image display light diffused by the diffuser plate into linearly-polarized image display light; and
   a polarization plate that transmits the linearly-polarized image display light emitted from the second wave plate,
   wherein at least the second wave plate and the polarization plate are placed such that the second wave plate and the polarization plate serve as a projection port cover that blocks a projection port of the projection unit, and
   wherein the projection port cover is provided parallel to a plane that forms the projection port and emits the image display light along a projection axis running from the projection unit to the virtual image presenting surface.

2. The image display device according to claim 1, wherein the diffuser plate is provided such that the diffused circularly-polarized image display light obliquely enters the second wave plate at a predetermined incident angle, and
   wherein the second wave plate converts the circularly-polarized image display light that has obliquely entered at the predetermined incident angle into linearly-polarized light and emits the linearly-polarized light.

3. The image display device according to claim 1 wherein the diffuser plate is a polarization-maintaining type diffuser plate that diffuses, while maintaining the polarization state of image display light that enters the diffuser plate, the image display light.

4. The image display device according to claim 1 wherein the diffuser plate is located between the first wave plate and the second wave plate.

* * * * *